(12) United States Patent
Zheng et al.

(10) Patent No.: US 7,209,491 B2
(45) Date of Patent: Apr. 24, 2007

(54) METHOD AND SYSTEM FOR TRANSMITTING DATA IN A PACKET BASED COMMUNICATION NETWORK

(75) Inventors: Haihong Zheng, Coppell, TX (US); Stefano Faccin, Dallas, TX (US)

(73) Assignee: Nokia Corporation, Espoo (FI)

( * ) Notice: Subject to any disclaimer, the term of this patent is extended or adjusted under 35 U.S.C. 154(b) by 1007 days.

(21) Appl. No.: 10/183,413

(22) Filed: Jun. 28, 2002

(65) Prior Publication Data

US 2004/0001508 A1 Jan. 1, 2004

(51) Int. Cl.
*H04L 12/56* (2006.01)
(52) U.S. Cl. .................. 370/477; 370/392; 455/72
(58) Field of Classification Search ................ 370/338, 370/349, 389, 466, 467, 400, 401, 328–330, 370/392, 429, 471, 477; 709/238; 455/72
See application file for complete search history.

(56) References Cited

U.S. PATENT DOCUMENTS

| 6,452,915 | B1 * | 9/2002 | Jorgensen | ................ 370/338 |
| 6,839,339 | B1 * | 1/2005 | Chuah | ................ 370/349 |
| 2003/0093553 | A1 | 5/2003 | Le et al. | |
| 2005/0213546 | A1 * | 9/2005 | Reitter et al. | ................ 370/338 |

FOREIGN PATENT DOCUMENTS

EP 1 122 925 A1 8/2001

OTHER PUBLICATIONS

RFC 1853: "IP In IP Tunnelling", by W. Simpson et al, Oct. 1995, p. 1.

RFC 2002: "IP Mobility Support", by C. Perkins, Editor IBM, Oct. 1996, pp. 1-64.

RFC: 2003: "IP Encapsulation within IP", by C. Perkins, IBM, Oct. 1998, pp. 1-14.

RFC: 2473: "Generic Packet Tunneling in IPv6 Specification", by A. Conta, Lucent Technologies, Inc. and S. Deering, Cisco Systems, Dec. 1998, pp. 1-36.

(Continued)

*Primary Examiner*—John Pezzlo
(74) *Attorney, Agent, or Firm*—Squire, Sanders & Dempsey L.L.P.

(57) ABSTRACT

A packed based data transmission scheme is proposed which comprises a method of transmitting data in a packet based communication network system through a tunnel between a receiving node (40; 210) and a sending node (10;110) communicating with each other via a communication network, said method comprising the steps of: generating (S10) an original packet to be sent to said receiving node, said original packet comprising a first header as an inner header indicating and a payload, generating (S20) a tunneled packet by encapsulating said original packet with a second header as an outer header, said outer header indicating an intermediate network station for the transmission of said tunneled packet, processing (S30) said tunneled packet for the transmission by compressing said inner header and by compressing said outer header and by generating a compressed packet. Furthermore, the method may comprise steps of decompressing (S50) from said compressed packet said outer header, and generating a routing packet, removing (S70) said outer header from said routing packet, and decompressing (S80) said inner header in said routing packet whereby said original packet is reconstructed. Moreover, a corresponding system and system entities are provided.

37 Claims, 6 Drawing Sheets

OTHER PUBLICATIONS

RFC: 3095: Robust Header Compression (ROHC): Framework and Four Profiles: RTP, UDSP, ESP and Uncompressed, by C. Bormann, Editor, TZI/Uni Bremen, etc., pp. 1-168.

DRAFT—IETF-ROHC-RTP-02, Robust Header Compression (ROHC) by Carsten Bormann (ed.(, TZI/Uni Bremen et al, Sep. 18, 200, pp. 1-104.

* cited by examiner

METHOD AND SYSTEM FOR TRANSMITTING DATA IN A PACKET BASED COMMUNICATION NETWORK

FIELD OF THE INVENTION

The present invention relates to a method and system for transmitting data in a packet based communication network, and in particular to a method and system for transmitting data in a packet based communication network by using compression and tunneling procedures.

BACKGROUND OF THE INVENTION

Packet based data transmission is widely used in the field of communication systems and commonly known to those skilled in the art. Usage of such a packet based data transmission is made, for example, for the transmission between a sending node and a receiving (terminal) node in fixed and mobile telecommunication systems, in Internet Protocol (IP) based networks and the like. The packet may comprise a payload, i.e. the data to be transmitted, and a header which indicates a source (i.e. the sending node) and a destination (i.e. the receiving terminal node) address. By means of the information comprised in the header, i.e. the source and destination addresses the transmitting communication network knows how to route the packet.

For the transmission of such a packet there has been developed a technique called tunneling. Tunneling, which is also termed as encapsulation, is a generic mechanism to encapsulate a packet and carries it as the payload of another packet.

Figure 5:
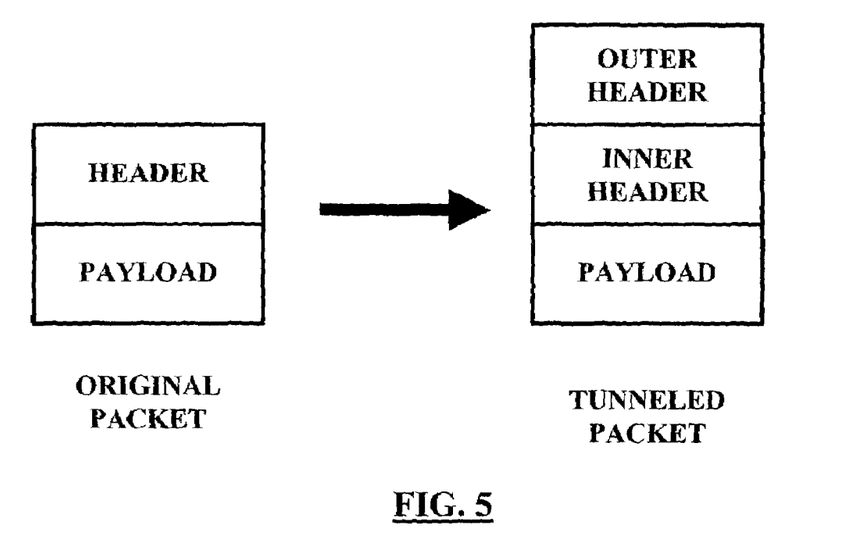
FIG. 5 illustrates a tunneling scheme.

The tunneling technique is fairly simple. As shown in FIG. 5, the tunneled packet is generated by adding an outer header before the header of the original packet (i.e. the original header and the payload). The source and destination in the outer header identify the source and destination of a tunnel, while the inner header's source and destination identify the original sender and recipient of the original packet.

Tunneling is suggested as a means to alter the normal routing for packets, by delivering them to an intermediate destination (tunnel) that may otherwise not be selected based on the destination address in the original header. Once the encapsulated packet arrives at this intermediate destination node, it is decapsulated (i.e. the added outer header is removed), yielding the original IP packet, which is then delivered to the destination indicated by the original (i.e. inner header's) destination address.

Tunneling is a popular mechanism used in network protocols. The Internet Engineering Task Force (IETF) has developed several specifications which are published as Request FOR Comments (RFC). In several of these RFCs, tunneling schemed are described, for example IP in IP tunneling (as defined in RFC 1853), generic packet tunneling using IPv6 (as defined in RFC 2473), IP encapsulation within IP (as defined in RFC 2003).

Tunneling is an important technique used for example in mobile IP communication networks to route the packet from a correspondent node to a mobile node. Below, mobile IP communication networks will be described in greater detail.

Recently, development of communication networks has made considerable progress. Among such communication networks, there is an increasing number of communication networks supporting mobility of the users having subscribed to the networks. A user is represented by a terminal node he uses for communication with a communication partner node.

Note that in general a communication partner node is of the same or a similar type than a terminal node, while "partner node" has only been chosen to illustrate that this is the destination or called node in communication. A terminal node/communication partner node may for example be a mobile phone, mobile laptop computer, a personal digital assistant (PDA) or the like. Nevertheless, a walled communication partner node may also be a fixed terminal such as e.g. a personal computer PC.

With the increasing spreading and acceptance of the Internet, a harmonization of communication networks arises in that communication networks tend to be compatible with the Internet. Thus there is a tendency to adopt the Internet Protocol IP also in communication networks other than the Internet. In particular in mobility supporting communication networks, IP is adopted in a mobility supporting version still compatible with IP "as such". For example, Mobile IPv4, Mobile IPv6 or Cellular IP protocol version exist. For the purpose of the present invention it is not crucial which protocol (mobile or fixed) is used, as long as the protocol is a packet-based protocol. It is to be noted that the invention defined below is applicable in relation with any mechanism that uses a tunneling protocol, in particular when there can be gained a benefit in terms of overhead thanks to a header compression to be defined below. A packet-based protocol is a protocol according to which data are transmitted in units of packets consisting of a payload section and a header section. The payload section carries the data to be communicated while the header section comprises management data required e.g. for routing of the packet and indicative of e.g. quality of service Qos provided for the packet. Also, the network itself is not limited for the present invention to be described later as long as the network is a packet-switched network supporting mobility of the users such as for example GPRS, UMTS, the Internet or the like.

A brief general introduction to Mobile IP and definitions of common terms in this technical field can be found under http://www.mobilein.com, retrieved from the Internet on Jun. 19, 2002.

In communication networks, terminal and/or communication partner nodes are identified by a permanent address PA. If the terminal is immobile, an access point address of the terminal to the network and the terminal's permanent address may coincide with each other. However, if the terminal is mobile, this addressing scheme will not work any longer.

When a mobile terminal identified in its home network by its PA is located outside of the home network (i.e. in a visited network) a temporary care of address (CoA) is assigned to the mobile terminal (i.e. mapped to its permanent address) by means of which the home network (i.e. a home agent as control and routing element) is enabled to forward data to the mobile terminal.

For example, Mobile IPv6 defines a mechanism known as Route Optimization. This mechanism enables correspondent nodes CN (communication partner nodes) to directly send packets to the mobile node MN (terminal node). Namely, when using Route Optimization, the mobile node MN sends a message (known as Binding Update message) indicating its care of address CoA to the correspondent code CN. The correspondent node CN caches (buffers) the binding of a mobile node (i.e. it maps the PA of the mobile node to the CoA address of the mobile node), and then sends its datagrams (packets) destined for the mobile node directly to the care of address, bypassing a mobile node's home agent. Mobile IPv6 Binding Update messages carry the CoA of the mobile node thus revealing information about its geographic location, but operators want to support Location Privacy. That is, by having knowledge of the mobile node's CoA, the Correspondent Node can deduce the geographic location of the Mobile Node. That is, a communication partner being aware of the (calling) terminal's care-of-address, may deduce the location (e.g. the visited network) of the terminal from this temporary address as explained before.

One possibility to avoid this is to use a mechanism known as triangular routing using a mobile node's home agent HA in the network. In this case, route optimization will not apply but on the contrary, the correspondent node sends the packets to the permanent address PA of the mobile node. Then the home agent of the mobile node's home network intercepts these packets. Since the home agent knows the CoA of the mobile node it is able to send the packets and can thus tunnel them to the MN. In the other direction, the mobile node will use the its PA as the source of its packets to be sent to the correspondent node, and in order to bypass ingress filtering, the mobile node first tunnels its packets to the home agent which will decapsulate them and send forward them to the correspondent node CN.

Figure 2:
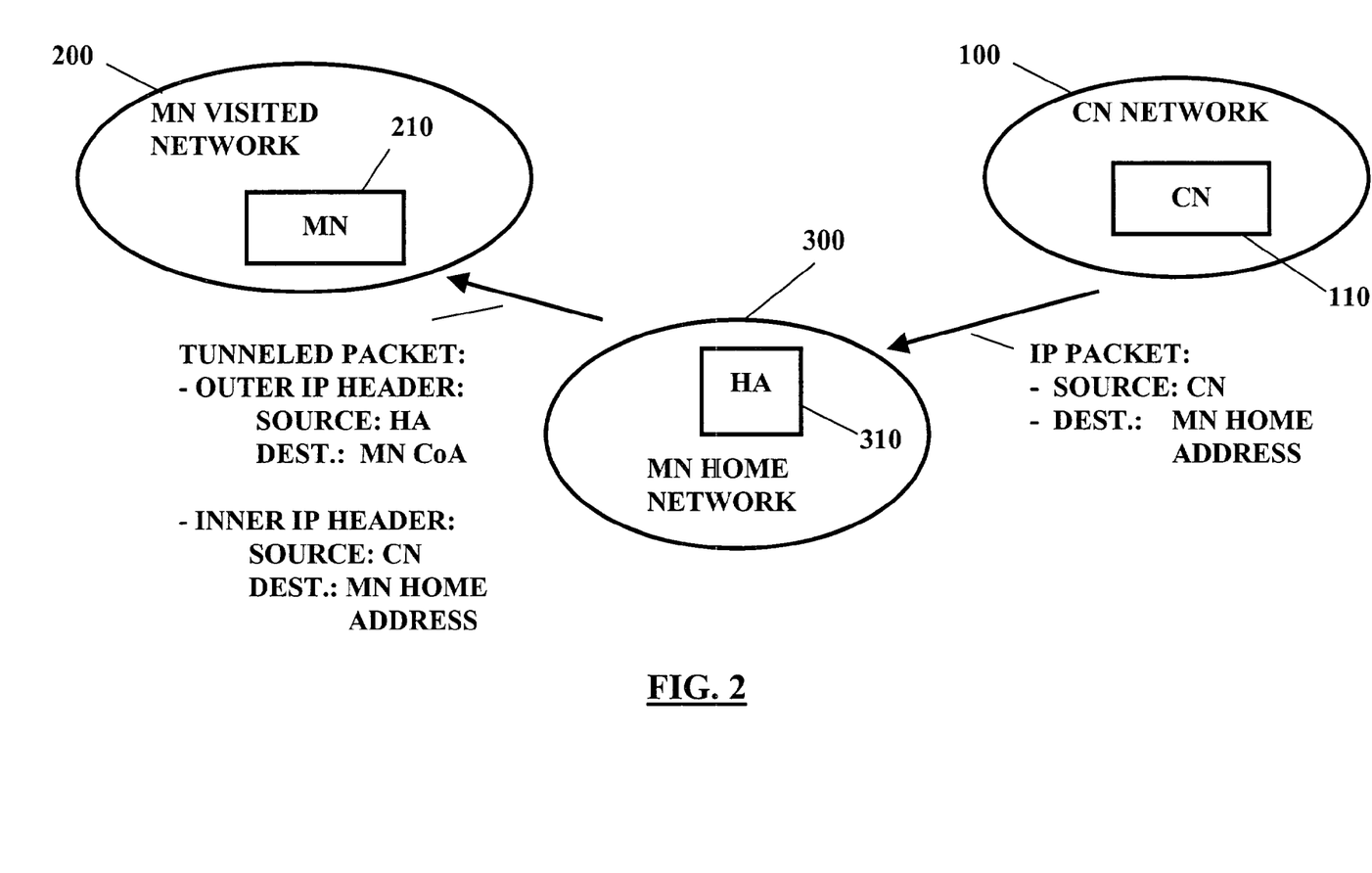
FIG. 2 shows a network environment comprising a home agent.

As can be seen, for example, in FIG. 2, if route optimization is not used in mobile IP, the correspondent node sends a packet to the permanent address of a mobile node. The packet is routed to the home agent HA in the home network of the mobile node. The HA tunnels the packet and sends it to the mobile node. The source and destination address in the outer header are the HA's address and the care of address of the mobile node.

An important feature for mobile communication networks is to provide location privacy. Location privacy means that the receiving node should not know where the initiating node is geographically located. Mobile IP based networks should at least support the current existing services for a commercial deployment and thus location privacy should be supported in mobile IP based networks.

In the U.S. patent application Ser. No. 09/986,602, filed on Nov. 9, 2001, on which content reference is made herewith, a solution for location privacy in a mobile communication network is proposed, e.g. in an IPv6 environment.

Figure 3:
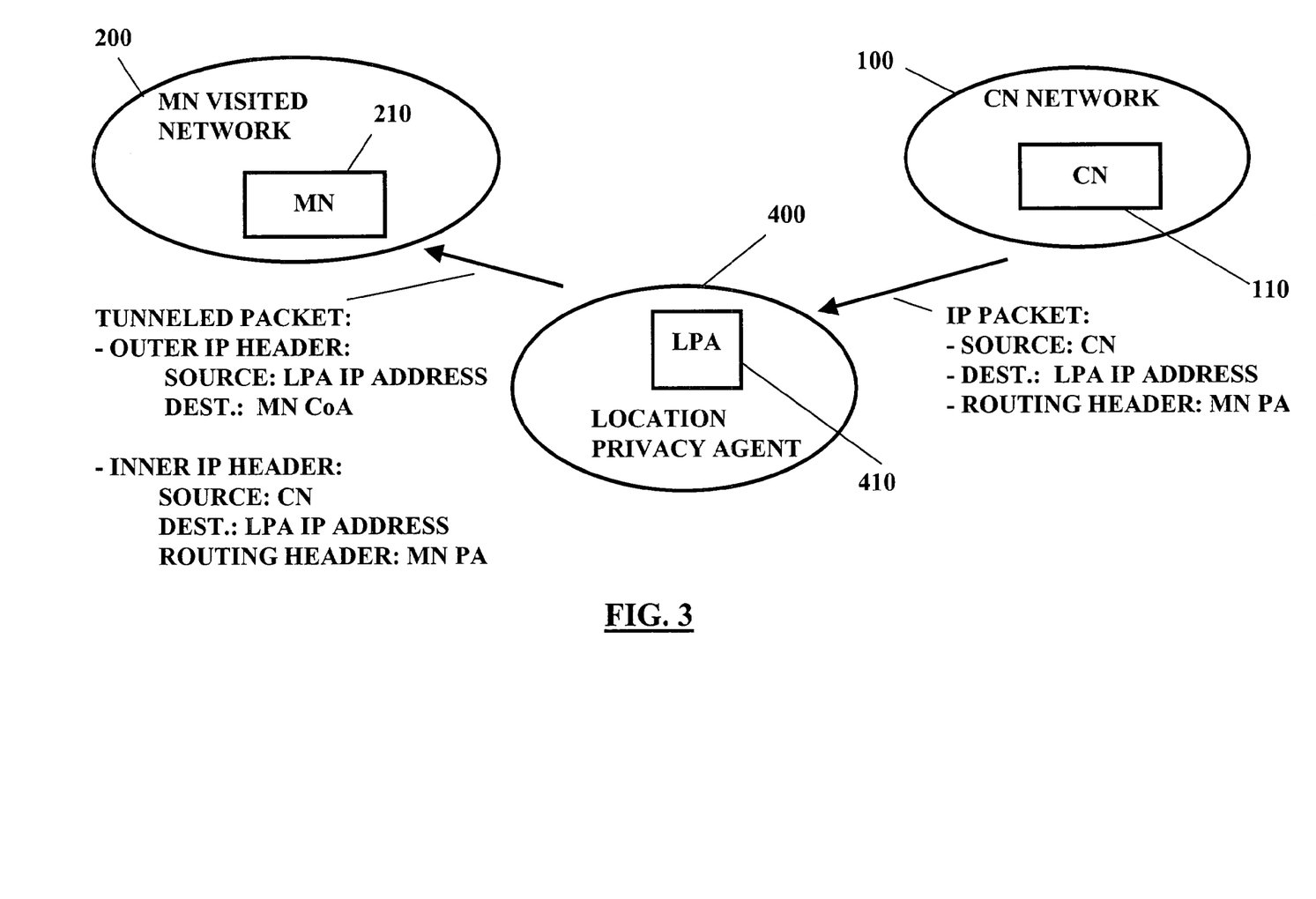
FIG. 3 shows a network environment comprising a location privacy agent.
Figure 4:
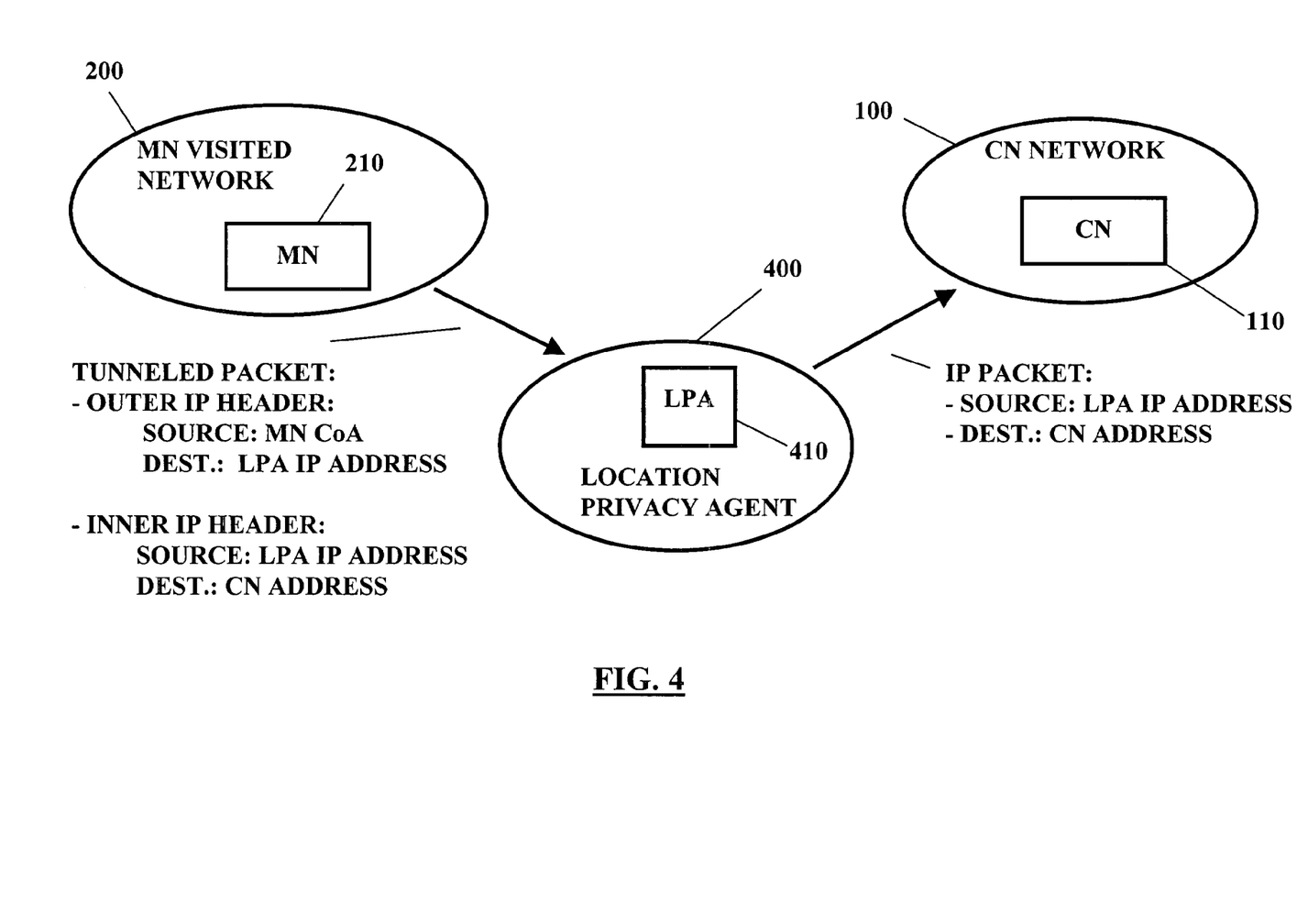
FIG. 4 shows a network environment comprising a location privacy agent.

In this location privacy solution, a location privacy server (LPS) and location privacy agents (LPA) are used to forward (tunnel) data between the correspondent node and the mobile node (as depicted, for example, in FIGS. 3 and 4). The LPS is located in the called mobile node's home network. When a data transmission to the mobile node is to be performed, the LPS chooses a LPA between the mobile node and the correspondent node and as close as possible to the correspondent node. On the basis of the CoA and the PA of the mobile node, a connection is established via the LPA as a tunnel. As also shown in FIGS. 3 and 4, the correspondent node sends a packet to the LPA with the PA of the mobile node as destination. The LPA encapsulates this packet addressed to a mobile node's home address and routes them transparently to the mobile node's care of address. On the other hand, the mobile node sends a packet originally addressed to the correspondent node to the LPA as intermediate destination (tunnel). The LPA decapsulates the tunneled packet (whereby the CoA of the mobile node is removed) and forwards the original packet comprising the LPA address as the source to the correspondent node. By this, the location of the mobile node can be concealed from the correspondent node by using a tunneled packet for the connection via the LPA.

However, the tunneling technique obviously produces more overhead by adding a new header to the original packet. Thus, for the transmission of the tunneled packet, more bandwidth is required in comparison to a transmission of just the original packet. This is in particular a problem in the case that long distances are between the correspondent node and the mobile node. The bandwidth efficiency brings challenges to the link layer, especially for the bandwidth limited link technology such as cellular links.

Figure 6:
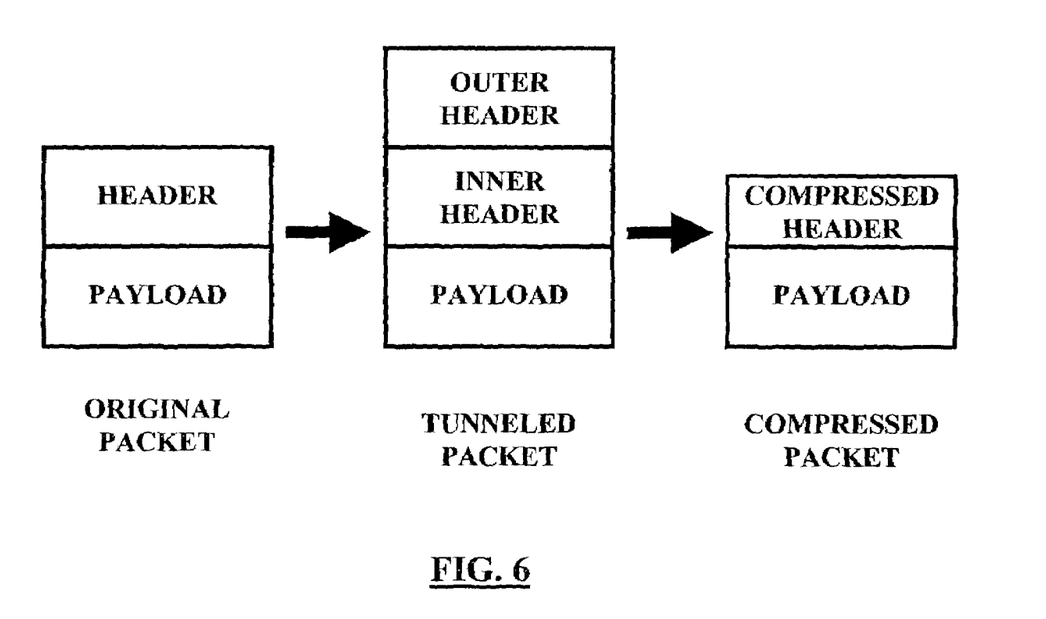
FIG. 6 illustrates a tunneling and compression scheme.

In order to solves this problem, compression mechanisms are used to reduce the overhead brought by the tunneling. The IETF has made some proposals for the compression of the header. The basic idea of header compression is to compress the header of the packet at a compressor side and then carry the compressed header plus the payload over the access link. According to the RFC3095, and as depicted in FIG. 6, a robust header compression scheme is used in which the inner header and the outer header of the tunneled packet is compressed.

With the described tunneling and compressing schemes, a packet based transmission scenario between a sender and a receiver is implemented in existing communication systems which will be described below with reference to FIG. 7.

Figure 7:
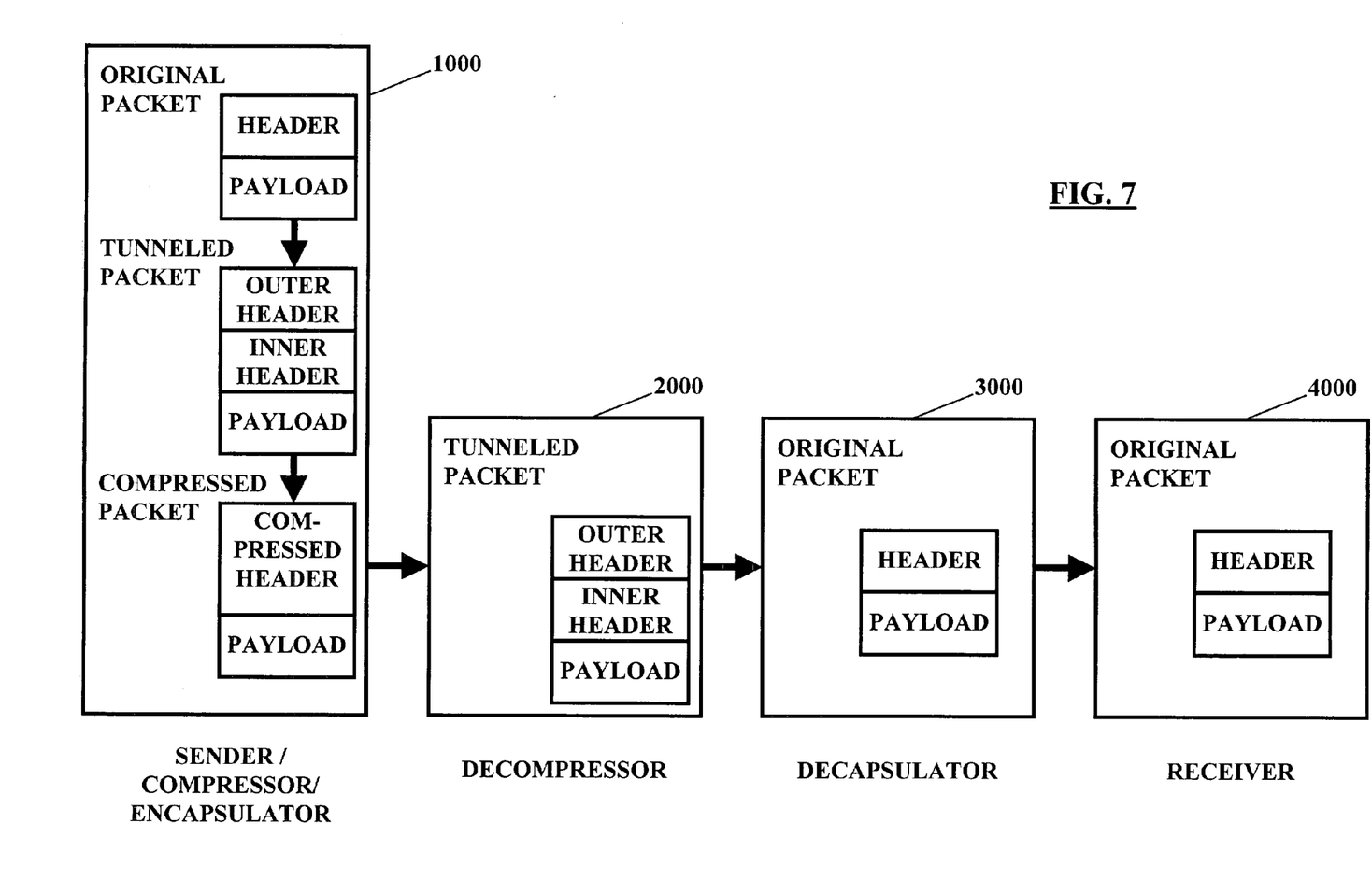
FIG. 7 shows a block diagram illustrating a packet data transmission scheme according to the prior art.

In the case shown in FIG. 7, the tunneling and header compression is performed at the same node, for example, a mobile node such as a mobile IP phone or the like. This means, an entity 1000 is the starting point of the tunnel and the compressor. Thus, the original packet comprising the payload and a first (inner) header is generated in the sender. Next, the original packet is forwarded to an encapsulator unit which adds a second (outer) header to the original packet in order to generate a tunneled packet. The tunneled packet is sent to a compressor unit. The compressor unit compresses, for example according to the RFC3095 scheme, the headers of the tunneled packet into a compressed header and generates thus a compressed packet. The compressed packet is sent over an (air) interface between the sender and a decompressor unit 2000. The decompressor unit 2000 decompresses the compressed header, i.e. the inner header and the outer header are recovered. The thus restored tunneled packet comprising the inner header, the outer header and the payload is sent from the decompressor unit 2000 to the ending point of the tunnel 3000. At this ending point of the tunnel 3000, a decapsulator unit decapsulates the tunneled packet, i.e. removes the outer header, and sends the thus recovered original packet to the original receiver 4000 indicated in the inner header.

However, it is obvious that this transmission scheme is in particular problematic in cases when the decompressor unit 2000 and the ending point of the tunnel 3000 (i.e. the decapsulator unit) are located in network elements having a great distance between them. If the decompressor unit and the decapsulator unit are far away from each other, the network bandwidth used to carry the tunneled packet is high. Hence, the bandwidth between these points is rather burdened. Based on the fact that the decompressor unit is normally located at the edge of the network (e.g., Base Station in the radio access network), while the end of the tunnel could be in the home network of the mobile node (e.g., home agent in mobile IP application) or close to the correspondent node (e.g., in the described Location Privacy Agent approach), the scenario of having decompressor unit and decapsulator unit far away from each other will happen frequently. Thus, the existing transmission scheme may lead to non-optimized resource usage on the link between the decompressor unit and the decapsulator unit.

Furthermore, in particular in the case of a network providing location privacy by a location privacy server/location privacy agent solution, there may arise another problem.

When the decapsulator unit is located in the location privacy agent, and when the decompressor unit (not being part of the location privacy agent) decompresses the header and thus generates the tunneled packet, the information of the headers (i.e. for example the CoA of the mobile node) will be visible to all network nodes involved in the connection between the decompressor unit and the decapsulator unit. Thus, location privacy may be vulnerable.

SUMMARY OF THE INVENTION

Thus, it is an object of the present invention to provide an improved method and/or system and/or system entity for a packed based communication connection by using a tunnel.

Furthermore, it is an object of the present invention to provide a method and/or system and/or system entity for a packed based communication connection by using a tunnel in which a bandwidth is saved.

Moreover, it is an object of the present invention to provide a method and/or system and/or system entity for a packed based communication connection by using a tunnel in which location privacy is maintained.

These objects are achieved, for example, by a method of transmitting data in a packet based communication network system through a tunnel, said packet based communication network system comprising at least a first communication network having a network element, a receiving node and a sending node, wherein said receiving node and said sending node communicate with each other via said at least first communication network, said method comprising the steps of generating an original packet to be sent to said receiving node, said original packet comprising a first header indicating a source address and a destination address for the transmission of said original packet and a payload, generating a tunneled packet by encapsulating said original packet with a second header so that said first header is an inner header and said second header is an outer header of said tunneled packet, said outer header indicating an intermediate source address and an intermediate destination address of an intermediate network station for the transmission of said tunneled packet, processing said tunneled packet for the transmission by compressing said inner header in order to form a compressed inner header, compressing said outer header in order to form a compressed outer header, and generating a compressed packet comprising said compressed inner header, said compressed outer header, and said payload.

According to further refinements of the method,
the method further comprises the steps of decompressing from said compressed packet said outer header, and generating a routing packet comprising said outer header, said compressed inner header and said payload;
the method further comprises the steps of removing said outer header from said routing packet, and decompressing said inner header in said routing packet whereby said original packet is reconstructed.

Additionally, according to still further refinements of the method,
said receiving node is identifiable as destination by a permanent network address (PA) and a temporary network address (CoA);
said packet based communication network system is based on a mobile Internet Protocol;
said intermediate network station may be located in a home agent of said receiving node, or in a location privacy network element.

said decompressing step of said outer header from said compressed packet is based on a first compression/decompression context;
said decompressing step of said inner header in said routing packet is based on a second compression/decompression context with said sending node.
said original packet may be forwarded from the sending node through the network before the encapsulating step;
the tunneled packet may be forwarded through the network before the processing step;
the compressed packet may be forwarded through the network;
the routing packet may be forwarded through the network;
the reconstructed original packet may be forwarded to the receiving node through the network.

Furthermore, these objects are achieved, for example, by a transmission system for transmitting data in a packet based communication network system through a tunnel, said packet based communication network system comprising at least a first communication network having a network element, a receiving node and a sending node, wherein said receiving node and said sending node communicate with each other via said at least first communication network, said transmission system comprising an encapsulator unit adapted to encapsulate an original packet generated by said sending node and to be sent to said receiving node, wherein said original packet comprises a first header indicating a source address and a destination address for the transmission of said original packet and a payload, wherein said encapsulator unit is adapted to generate a tunneled packet by encapsulating said original packet with a second header so that said first header is an inner header and said second header is an outer header of said tunneled packet, said outer header indicating an intermediate source address and an intermediate destination address of an intermediate network station for the transmission of said tunneled packet, a first compressor unit adapted to compress said inner header in order to form a compressed inner header, a second compressor unit adapted to compress said outer header in order to form a compressed outer header, wherein said compressed inner header, said compressed outer header, and said payload are combined into a compressed packet.

According to further refinements of the system
the system comprises further a decompressor unit adapted to decompress said outer header from said compressed packet, wherein said outer header, said compressed inner header and said payload are combined into a routing packet;
the system comprises further a decapsulator unit adapted to remove said outer header from said routing packet, and to decompress said inner header in said routing packet whereby said original packet is reconstructed.

Additionally, according to still further refinements of the system
said first compressor unit and said second compressor unit are integrated into a single unit;
said receiving node is identifiable as destination by a permanent network address (PA) and a temporary network address (CoA);
said packet based communication network system is based on a mobile Internet Protocol;
said intermediate network station is located in a home agent of said receiving node or in a location privacy network element;

said decompressor unit executes the decompression of said outer header from said compressed packet on the basis of a first compression/decompression context;

said decapsulator unit executes the decompression of said inner header in said routing packet on the basis of a second compression/decompression context with said sending node;

said original packet may be forwarded from the sending node to the encapsulator unit through the network.

the tunneled packet may be forwarded to the compressor units through the network;

the compressed packet may be forwarded through the network;

the routing packet may be forwarded through the network;

the reconstructed original packet may be forwarded to the receiving node through the network.

Moreover, these object are achieved, for example, by a compressor entity usable for a data transmission in a packet based communication network system through a tunnel, said packet based communication network system comprising at least a first communication network having a network element, a receiving node and a sending node, wherein said receiving node and said sending node communicate with each other via said at least first communication network, wherein an original packet generated by said sending node and to be sent to said receiving node, said original packet comprising a first header indicating a source address and a destination address for the transmission of said original packet and a payload, is encapsulated with a second header into a tunneled packet so that said first header is an inner header and said second header is an outer header of said tunneled packet, said outer header indicating an intermediate source address and an intermediate destination address of an intermediate network station for the transmission of said tunneled packet, wherein said compressor entity comprises a first compressor unit adapted to compress said inner header in order to form a compressed inner header, and a second compressor unit adapted to compress a said outer header in order to form a compressed outer header, wherein said compressed inner header, said compressed outer header, and said payload are combined into a compressed packet.

Furthermore, these objects are achieved, for example, by a decompressor unit usable for a data transmission in a packet based communication network system through a tunnel, said packet based communication network system comprising at least a first communication network having a network element, a receiving node and a sending node, wherein said receiving node and said sending node communicate with each other via said at least first communication network, wherein an original packet generated by said sending node and to be sent to said receiving node, said original packet comprising a first header indicating a source address and a destination address for the transmission of said original packet and a payload, is encapsulated with a second header into a tunneled packet so that said first header is an inner header and said second header is an outer header of said tunneled packet, said outer header indicating an intermediate source address and an intermediate destination address of an intermediate network station for the transmission of said tunneled packet, and said tunneled packet is compressed into a compressed packet wherein said inner header is compressed in order to form a compressed inner header and said outer header is compressed in order to form a compressed outer header, wherein said compressed inner header, said compressed outer header, and said payload are combined into said compressed packet wherein said decompressor entity is adapted to decompress said outer header from said compressed packet, wherein said outer header, said compressed inner header and said payload are combined into a routing packet.

Moreover, these objects are achieved, for example, by a decapsulator entity usable for a data transmission in a packet based communication network system through a tunnel, said packet based communication network system comprising at least a first communication network having a network element, a receiving node and a sending node, wherein said receiving node and said sending node communicate with each other via said at least first communication network, wherein an original packet generated by said sending node and to be sent to said receiving node, said original packet comprising a first header indicating a source address and a destination address for the transmission of said original packet and a payload, is encapsulated with a second header into a tunneled packet so that said first header is an inner header and said second header is an outer header of said tunneled packet, said outer header indicating an intermediate source address and an intermediate destination address of an intermediate network station for the transmission of said tunneled packet, said tunneled packet is compressed into a compressed packet wherein said inner header is compressed in order to form a compressed inner header and said outer header is compressed in order to form a compressed outer header, wherein said compressed inner header, said compressed outer header, and said payload are combined into said compressed packet, and said compressed packet is decompressed into a routing packet so that said outer header from said compressed packet is decompressed, wherein said outer header, said compressed inner header and said payload are combined into said routing packet wherein said decapsulator entity is adapted to remove said outer header from said routing packet, and to decompress said inner header in said routing packet whereby said original packet is reconstructed.

Finally, these objects are achieved, for example, by a computer program product usable for a data processing apparatus, comprising software code portions for performing the steps of the above described method when said product is run on said data processing apparatus. Said computer program product may comprise a medium readable by said data processing apparatus, on which said software code portions are stored. Also, said computer program product may be directly loadable into an internal memory of said data processing apparatus.

By virtue of the present invention, the following advantages can be achieved:

Network bandwidth between the decompressor side and the end of the tunnel (i.e. the decapsulator side) can be saved due to the fact that the packet (i.e. the routing packet) comprises only a compressed inner header and the payload. Thus, only a minimum amount of data is forwarded over the link of these elements. For example, the traffic in a wired IP network can also be decreased.

When using a location privacy model, as for example disclosed in the U.S. patent application Ser. No. 09/986,602, filed on Nov. 9, 2001, the security level for the header information is further improved. When the inner header and the outer header are compressed separately, the inner header is still compressed when sending the packet to the end of the tunnel. Thus, no node on the path can understand the information of the inner header unless it understands the compression context that is maintained in mobile node and LPA. Hence, an extra security protection is provided between the MN and LPA.

The above and still further objects, features and advantages of the invention will become more apparent upon referring to the description and the accompanying drawings.

DESCRIPTION OF PREFERRED EMBODIMENTS

Figure 1:
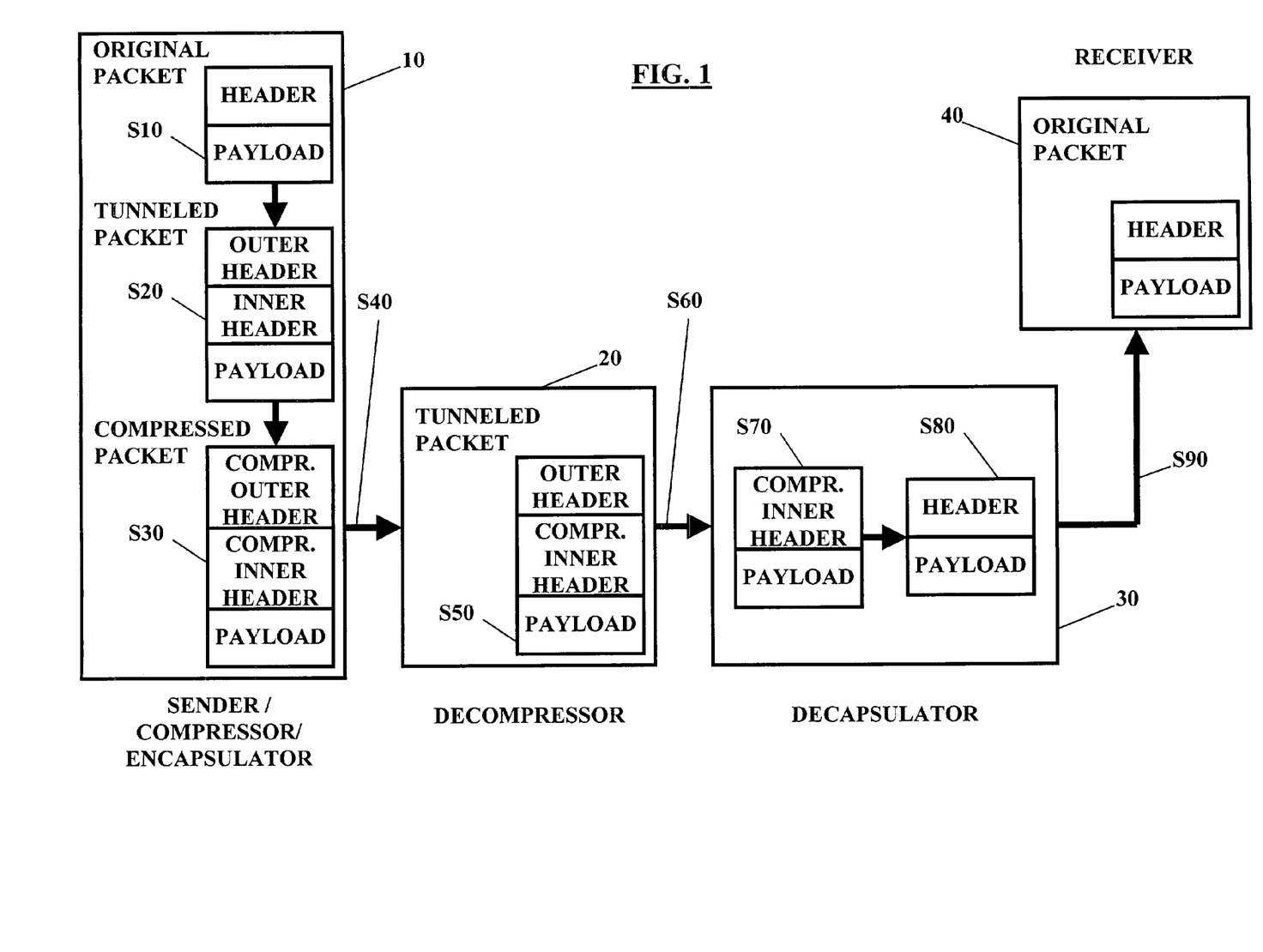
FIG. 1 shows a block diagram illustrating a packet data transmission scheme according to a preferred embodiment of the invention.

With reference to FIG. 1, a block diagram illustrating a packet data transmission scheme according to a preferred embodiment of the invention is described.

Similar to the illustration of the existing transmission scheme according to FIG. 7, it is assumed that the tunneling and header compression is performed at the same node, for example, a mobile node such as a mobile IP phone or the like. However, it is to be noted that, dependent on the communication network structure and system settings, these operations may be performed also in different network nodes which will be described later.

In an entity 10, which represents also the starting point of the tunnel according to this example, an original packet is generated (step S10). This is done by providing a payload to be transmitted to a receiver 40 with a header indicating a source (i.e. sender address, for example IP address or permanent address of the sender) and a destination of the packet (i.e. receiver address, for example IP address or permanent address of the receiver). Next, the original packet is forwarded to an encapsulator unit in which the original packet is encapsulated with a second header (step S20). This means, that the second header is added as an outer header to the original packet, thus making the original header to an inner header, in order to generate a tunneled packet. The outer header identifies the source and destination of the tunnel, i.e. of the intermediate destination or station which is used for the routing of the packet.

The tunneled packet is sent to a compressor unit which processes the tunneled packet for a further forwarding (step S30). In this processing operation, the compressor unit compresses the inner header of the tunneled packet in order to generate a compressed inner header and the outer header of the tunneled packet in order to generate a compressed outer header. In other words, the compressor unit can be seen to be separated in two parts. The first part compresses the outer header and the second part compresses the inner header. For the compression, the two parts may use a first and a second compression/decompression context which will be described later. Furthermore, it is possible that the first and second compressor unit parts "sandwich" the encapsulator unit. This means that the header of the original packet is compressed into the compressed inner header before the second (outer) header is added and compressed thereafter. This is possible, for example, when the encapsulator unit and the compressor unit are within the same network node.

The compressed packet is sent via an access link to a decompressor unit 20 (step S40). The access link may comprise various network nodes in dependence of the routing (i.e. of the selected tunnel path) for the packet. These network nodes may be part of the same communication network or located in different communication networks. For example, air or wired interfaces between the sender 10 and the decompressor unit 20 may be used. When the compressed packet reaches the decompressor unit 20, the decompressor unit 20 decompresses only the outer header from the compressed packet while the compressed inner header is maintained (step S50). For this purpose, the decompressor unit 20 and the compressor unit have negotiated the first compression/decompression context. Thus, the decompressor unit generates a new packet which can be called "routing packet". The routing packet contains the (decompressed) outer header, the compressed inner header and the payload. In other words, since only the outer header is needed to route the packet to the ending point of the tunnel, the inner header is not decompressed and can still be carried in the compressed format. This serves to save network bandwidth and to improve information security.

On the basis of the tunnel source and destination information obtained from the decompressed outer header, the decompressor unit 20 forwards the routing packet to a decapsulator unit 30 (step S60). The decapsulator unit 30 represents the end of the tunnel and may be located in a network node different to that of the decompressor unit 30. For example, the decapsulator unit 30 is located in a different network and connected with the decompressor unit, for example, via access links and gateway nodes. The decapsulator unit 30 decapsulates the routing packet (step S70). This means that the outer header is removed from the packet. Then, the decapsulator unit 30 decompresses the remaining compressed inner header in order to recover the original packet (step S80). For this decompression, the decapsulator unit negotiates the second compression/decompression context with the compression unit.

Finally, the original packet is routed from the end point of the tunnel (i.e. the decapsulator unit 30) to the receiver 40 indicated in the inner header as the destination (step S90).

The data transmission scheme described above can be used for various applications. In the following, two preferred application examples will be described with reference to FIGS. 2 and 3, 4, respectively. However, it is obvious for persons skilled in the art that the above described data transmission scheme is not limited to these examples.

In a first example the above described data transmission scheme is situated in a mobile IP network environment as shown in FIG. 2. An IP packet is to be sent from a correspondent node CN 110 located in its CN home network 100 to a mobile node MN 210 located in a MN visited network 200 which is not the home network 300 of the MN 210. The MN 210 is identifiable by its permanent address PA in its home network and by an allocated care of address CoA in the visited network. The CN 110 is only aware of the PA of the MN 210. This means that the IP packet is to be routed (tunneled) via the MN home network's home agent HA 310 which is aware of the CoA (i.e. the current location) of the MN 210. The CN 110 sends the packet (which is the original packet) to the home network 300 of the MN 210. The header of the sent (original) packet comprises the CN address as the source and the MN home address as the destination. The HA 310 intercepts the sent packet and processes it for tunneling.

For this purpose, the HA 310 encapsulates the original packet with an outer header which identifies the HA 310 as the source and the MN CoA as the destination of the tunnel. When HA 310 sends the tunneled packet to the MN 210, the HA 310 can compress the inner header of the tunneled packet by a first compressor unit part. Then, the HA 310 sends this packet to a (not shown) second compressor unit part which may be located beyond the access link. The second compressor unit part then compresses the outer header and generates thus the compressed packet. The compressed packet is sent over a further access link to the MN 210 in the MN visited network 200. When the MN 210 received the compressed packet, first the outer header is decompressed and removed. Then the inner header is decompressed, and information contained therein is provided to upper processing layers for further processing.

In a second example the above described data transmission scheme is situated in a mobile IP network environment as shown in FIGS. 3 and 4. Here, a location privacy solution as described, for example, in U.S. patent application Ser. No. 09/986,602, filed on Nov. 9, 2001, is implemented.

In a first case, the CN 110 located in its home network 100 intends to send a packet to the MN 210 in the visited network 200. By the location privacy system, i.e. the location privacy server LPS, a Location privacy agent LPA 410 is allocated which is located in a network 400 which may be the home network of the MN. The CN 110 sends an IP packet comprising an inner header to the LPA 410 whose address is disclosed by the LPS. The header of this IP packet comprises the CN address as the source and the LPA IP address as the destination. Additionally the packet comprises a routing header indicating the permanent address PA of the MN. The further processing in this first case may be similar to the first example described in connection with FIG. 2 with the exception that the headers (outer header and inner header) comprise different source and destination addresses (e.g. LPA IP address in the outer header) which influence the forwarding of the packets. However it is obvious that the compression, decompression, tunneling and decapsulation processes are the same as described above.

In a second case of the second example, as shown in FIG. 4, an IP packet is intended to be sent from the MN 210 in the visited network 200 via the LPA 410 in the (e.g. MN home) network 400 to the CN in its home network 100. Here, the MN 210 acts as a sender/encapsulator/compressor unity. The MN 210 generates the (original) packet to be sent to the CN 110 with a payload and a (inner) header identifying the LPA's address as the source and the CN address as the destination. This packet is encapsulated to become the tunneled packet by adding an outer header identifying the MN CoA as the source and the LPA IP address as the destination. Before the tunneled packet is sent to the LPA 410, the MN 210 first compresses the inner header into the compressed inner header, and then compresses the outer header into the compressed outer header. The thus obtained compressed packet comprising the compressed inner header and compressed outer header is sent over the access link and reaches the decompressor unit (for example a network node in the visited network 200). The decompressor unit decompresses the outer header and sends the thus obtained packet with the outer header as well as the compressed inner header and the payload. When the packet reaches the LPA 410, the LPA 410 removes the outer header, and then decompresses the compressed inner header, and produces the original packet which is forwarded to the CN 110.

As apparent from the above description, a first advantage of the proposed data transmission scheme is that it saves network bandwidth between the decompressor unit and the end of the tunnel (i.e., the decapsulator unit) significantly. Even though, in comparison to the transmission scheme according to the prior art, a greater overhead over the access link between the compressor and the decompressor is to be sent, this overhead is rather small in comparison with the bandwidth saved between the decompressor unit and the decapsulator unit. Additionally, an enhanced location privacy feature is provoided.

This will become also obvious from the following statistics comparing the overhead load in different links with the proposed scheme and the existing scheme. Assuming Ipv6 in Ipv6 encapsulation is used as tunneling protocol. Furthermore, it is also assumed that the traffic is a real time transport protocol (RTP) traffic with a 32 bytes payload. In addition, the header size for Ipv6 header (i.e. inner header and outer header, respectively) is 40 bytes, for a user datagram protocol (UDP), which may be used as data transport protocol, header is 8 bytes and for RTP header is 12 bytes. Thus the tunneled packet size results in 132 bytes. Moreover, it is assumed that the compressed header size is 1 byte in best case.

With the existing scheme (FIG. 7), the compressed packet size is 33 bytes (1 byte compressed header and 32 bytes payload) and the compression ratio is 33/132=25%. The size of the packet transmitted between the decompressor unit 2000 and the decapsulator unit 3000 is still 132 bytes. The compression ratio over the link between the decompressor unit and the decapsulator unit is 100%.

With the scheme proposed above (FIG. 1), the compressed packet size is 34 bytes (1 byte compressed outer header, 1 byte compressed inner header and 32 bytes payload) and the compression ratio is 34/132=25.76%. This is just slightly larger than the compression ratio when robust header compression (Rohc) scheme of FIG. 7 is used. However, the size of the packet transmitted between the decompressor 20 unit and the decapsulator 30 unit is decreased to only 73 bytes (40 bytes IP tunneling header, 1 byte compressed inner header and 32 bytes payload). Hence, the compression ratio over the link between the decompressor unit and the decapsulator unit is 73/132=55.3%. This basically implies that with the proposed data transmission scheme the overhead load between the decompressor unit and the decapsulator unit is significantly decreased.

Furthermore, the data transmission scheme proposed above provides an enhanced security control between the sender and the decapsulator unit, in particular in a location privacy system. This is achieved by sending the compressed inner header between them. When, for example, the mobile MN node would compress both the inner header and the outer header together into one compressed header, and send the compressed header over the access link, security could be violated. Namely, when the decompressor unit decompresses the packet, both inner header and outer header are decompressed. Hence, information of the inner header can be seen by every node on the path from the decompressor unit and the LPA. However, with the proposed scheme, the inner header and the outer header are compressed separately. After the decompressor unit, beyond the access link, decompresses the outer header, it sends the packet to the LPA. Since the inner header in the packet is still compressed, no node on the path can understand the inner header unless it understand the compression/decompression context that is maintained in the mobile node (the sender/compressor) and the LPA. When LPA receives the packet with the compressed inner header, it has just to remove the outer header and decompress the inner header, and then it can send the packet which does not contain any information concerning the CoA of the MN, to the correspondent node CN.

It is clear from the above that the present invention is applicable in any network (fixed or mobile) in which a packet based data transmission is used, in particular when header compression mechanisms are used.

The features of the present invention, in particular the compression functionality, the decompression functionality and the decapsulation functionality, may be implemented in packet based communication networks by means of software/firmware. For this purpose, a computer program product usable for a data processing apparatus is provided which comprises software code portions for performing the steps of the above described data transmission scheme. This means, that software code portions defining in particular the compression functionality, the decompression functionality and the decapsulation functionality are loaded into the involved network nodes and mobile terminals by means of commonly known input means. The loaded software code portions are stored in respective memories and processed in processing means such as a CPU which forms a part of the network node. The computer program product may further comprise a medium readable by said data processing apparatus, on which said software code portions are stored, for example a CD-ROM, floppy disk, EEPROM and the like with are connectable and readable by respective input means. It is also possible to directly load said computer program product into an internal memory of said data processing apparatus, such as a working RAM of the CPU.

As described above, a packed based data transmission scheme is proposed which comprises a method of transmitting data in a packet based communication network system through a tunnel between a receiving terminal node (40; 210) and a sending node (10;110) communicating with each other via a communication network, said method comprising the steps of: generating (S10) an original packet to be sent to said receiving terminal node, said original packet comprising a first header as an inner header indicating and a payload, generating (S20) a tunneled packet by encapsulating said original packet with a second header as an outer header, said outer header indicating an intermediate network station for the transmission of said tunneled packet, processing (S30) said tunneled packet for the transmission by compressing said inner header and by compressing said outer header and by generating a compressed packet. Furthermore, the method may comprise steps of decompressing (S50) from said compressed packet said outer header, and generating a routing packet, removing (S70) said outer header from said routing packet, and decompressing (S80) said inner header in said routing packet whereby said original packet is reconstructed. Moreover, a corresponding system and system entities are provided.

It should be understood that the above description and accompanying figures are merely intended to illustrate the present invention by way of example only. The preferred embodiments of the present invention may thus vary within the scope of the attached claims.

The invention claimed is:

1. A method of transmitting data in a packet based communication network system through a tunnel, said packet based communication network system comprising at least a first communication network having a network element, a receiving node and a sending node, wherein said receiving node and said sending node communicate with each other via said at least first communication network, said method comprising the steps of:

generating an original packet to be sent to said receiving node, said original packet comprising a first header indicating a source address and a destination address for the transmission of said original packet and a payload;

generating a tunneled packet by encapsulating said original packet with a second header so that said first header is an inner header and said second header is an outer header of said tunneled packet;

said outer header indicating an intermediate source address and an intermediate destination address of an intermediate network station for the transmission of said tunneled packet;

processing said tunneled packet for the transmission by compressing said inner header in order to form a compressed inner header;

compressing said outer header in order to form a compressed outer header; and generating a compressed packet comprising said compressed inner header, said compressed outer header, and said payloads, wherein said receiving node is identifiable as destination by a permanent network address and a temporary network address.

2. A method according to claim 1, comprising the steps of:

decompressing from said compressed packet said outer header; and generating a routing packet comprising said outer header, said compressed inner header and said payload.

3. A method according to claim 2, comprising the steps of:

removing said outer header from said routing packet; and decompressing said inner header in said routing packet whereby said original packet is reconstructed.

4. A method according to claim 1, wherein:

said packet based communication network system is based on a mobile Internet Protocol.

5. A method according to claim 1, wherein:

said intermediate network station is located in a home agent of said receiving node.

6. A method according to claim 1, wherein:

said intermediate network station is located in a location privacy network element.

7. A method according to claim 2, wherein:

said step of decompressing said outer header from said compressed packet is based on a first compression/decompression context.

8. A method according to claim 3, wherein:

said step of decompressing said inner header in said routing packet is based on a second compression/decompression context.

9. A method according to claim 1, comprising:

a step of forwarding said original packet from said sending node through said network before said encapsulating step.

10. A method according to claim 1, comprising:

a step of forwarding said tunneled packet through said network before said processing step.

11. A method according to claim 1, comprising:

a step of forwarding said compressed packet through said network.

12. A method according to claim 2, comprising:

a step of forwarding said routing packet through said network.

13. A method according to claim 3, comprising:

a step of forwarding said reconstructed original packet through said network to said receiving node.

14. A transmission system for transmitting data in a packet based communication network system through a tunnel, said packet based communication network system comprising:
- at least a first communication network having a network element, a receiving node and a sending node, wherein said receiving node and said sending node communicate with each other via said at least first communication network;
- said transmission system comprising an encapsulator unit which encapsulates an original packet generated by said sending node and to be sent to said receiving node, wherein said original packet comprises a first header indicating a source address and a destination address for the transmission of said original packet and a payload;
- wherein said encapsulator unit generates a tunneled packet by encapsulating said original packet with a second header so that said first header is an inner header and said second header is an outer header of said tunneled packet, said outer header indicating an intermediate source address and an intermediate destination address of an intermediate network station for the transmission of said tunneled packet;
- a first compressor unit which compresses said inner header in order to form a compressed inner header;
- a second compressor unit which compresses said outer header in order to form a compressed outer header; and wherein
- said compressed inner header, said compressed outer header, and said payload are combined into a compressed packets,
- wherein said receiving node is identifiable as a destination by a permanent network address and a temporary network address.

15. A system according to claim 14, comprising:
- a decompressor unit which decompresses said outer header from said compressed packet; and wherein
- said outer header, said compressed inner header and said payload are combined into a routing packet.

16. A system according to claim 15, comprising:
a decapsulator unit which removes said outer header from said routing packet, and decompresses said inner header in said routing packet whereby said original packet is reconstructed.

17. A system according to claim 14, wherein:
said first compressor unit and said second compressor unit are integrated into a single unit.

18. A system according to claim 14, wherein:
said packet based communication network system is based on a mobile Internet Protocol.

19. A system according to claim 14, wherein:
said intermediate network station is located in a home agent of said receiving node.

20. A system according to claim 14, wherein:
said intermediate network station is located in a location privacy network element.

21. A system according to claim 15, wherein:
said decompressor unit executes the decompression of said outer header from said compressed packet on the basis of a first compression/decompression context.

22. A system according to claim 16, wherein:
said decapsulator unit executes the decompression of said inner header in said routing packet on the basis of a second compression/decompression context.

23. A system according to claim 14, wherein:
said original packet is forwarded from said sending node to said encapsulator unit through said network.

24. A system according to claim 14, wherein:
said tunneled packet is forwarded to said compressor units through said network.

25. A system according to claim 14, wherein:
said compressed packet is forwarded through said network.

26. A system according to claim 15, wherein:
said routing packet is forwarded through said network.

27. A system according to claim 16, wherein:
said reconstructed original packet is forwarded to said receiving node through said network.

28. A packet based network system, comprising:
- at least a first communication network having a network element, a receiving node and a sending node, wherein said receiving node and said sending node communicate with each other via said at least first communication network;
- wherein an original packet generated by said sending node and to be sent to said receiving node, comprises a first header indicating a source address and a destination address for the transmission of said original packet and a payload, and is encapsulated with a second header into a tunneled packet so that said first header is an inner header and said second header is an outer header of said tunneled packet;
- said outer header indicating an intermediate source address and an intermediate destination address of an intermediate network station for the transmission of said tunneled packet; and wherein
- said compressor entity comprises a first compressor unit which compresses said inner header in order to form a compressed inner header, and a second compressor unit which compresses a said outer header in order to form a compressed outer header; and wherein
- said compressed inner header, said compressed outer header, and said payload are combined into a compressed packets,
- wherein said receiving node is identifiable as destination by a permanent network address and a temporary network address.

29. A packet based network system according to claim 28, wherein:
said first compressor unit and said second compressor unit are integrated into a single unit.

30. A packet based network system according to claim 28, wherein:
said packet based communication network system is based on a mobile Internet Protocol.

31. A packet based network system, comprising
- at least a first communication network having a network element, a receiving node and a sending node, wherein said receiving node and said sending node communicate with each other via said at least first communication network;
- wherein an original packet generated by said sending node and to be sent to said receiving node, comprises a first header indicating a source address and a destination address for the transmission of said original packet and a payload and is encapsulated with a second header into a tunneled packet so that said first header is an inner header and said second header is an outer header of said tunneled packet;
- said outer header indicating an intermediate source address and an intermediate destination address of an intermediate network station for the transmission of said tunneled packet; and said tunneled packet is compressed into a compressed packet wherein said inner header is compressed in order to form a compressed inner header and said outer header is compressed in order to form a compressed outer header, wherein said compressed inner header, said compressed outer header, and said payload are combined into said compressed packet; and wherein said decompressor entity decompresses said outer header from said compressed packet, wherein said outer header, said compressed inner header and said payload are combined into a routing packet, wherein said receiving node is identifiable as destination by a permanent network address and a temporary network address.

32. A packet based network system according to claim 31, wherein:

said packet based communication network system is based on a mobile Internet Protocol.

33. A packet based network system according to claim 31, wherein:

the decompression of a said outer header from said compressed packet is executed on the basis of a first compression/decompression context.

34. A packet based network system, comprising:

at least a first communication network having a network element, a receiving node and a sending node, wherein said receiving node and said sending node communicate with each other via said at least first communication network;

wherein an original packet generated by said sending node and to be sent to said receiving node, comprises a first header indicating a source address and a destination address for the transmission of said original packet and a payload and is encapsulated with a second header into a tunneled packet so that said first header is an inner header and said second header is an outer header of said tunneled packet, said outer header indicating an intermediate source address and an intermediate destination address of an intermediate network station for the transmission of said tunneled packet;

said tunneled packet is compressed into a compressed packet wherein said inner header is compressed in order to form a compressed inner header and said outer header is compressed in order to form a compressed outer header, wherein said compressed inner header, said compressed outer header, and said payload are combined into said compressed packet; and said compressed packet is decompressed into a routing packet so that said outer header from said compressed packet is decompressed, wherein said outer header, said compressed inner header and said payload are combined into said routing packet; and wherein said decapsulator entity removes said outer header from said routing packet, and decompresses said inner header in said routing packet whereby said original packet is reconstructed, wherein said receiving node is identifiable as destination by a permanent network address and a temporary network address.

35. A packet based network system according to claim 34, wherein:

said packet based communication network system is based on a mobile Internet Protocol.

36. A packet based network system according to claim 34, wherein:

the decompression of said inner header from said routing packet is executed on the basis of a second compression/decompression context.

37. A packet based communication network system, comprising:

at least a first communication network having a network element, a receiving node and a sending node, wherein said receiving node and said sending node communicate with each other via said at least first communication network;

means for generating an original packet to be sent to said receiving node, said original packet comprising a first header indicating a source address and a destination address for the transmission of said original packet and a payload;

means for generating a tunneled packet by encapsulating said original packet with a second header so that said first header is an inner header and said second header is an outer header of said tunneled packet, said outer header indicating an intermediate source address and an intermediate destination address of an intermediate network station for the transmission of said tunneled packet;

means for processing said tunneled packet for the transmission by compressing said inner header in order to form a compressed inner header;

means for compressing said outer header in order to form a compressed outer header; and means for generating a compressed packet comprising said compressed inner header, said compressed outer header, and said payload, wherein said receiving node is identifiable as destination by a permanent network address and a temporary network address.

* * * * *